(12) United States Patent
Kasamoto et al.

(10) Patent No.: US 9,552,912 B2
(45) Date of Patent: Jan. 24, 2017

(54) MAGNETIC RUBBER COMPOSITION, MAGNETIC RUBBER MOLDED ARTICLE OBTAINED BY CROSSLINKING THE SAME, AND MAGNETIC ENCODER

(71) Applicant: UCHIYAMA MANUFACTURING CORP., Okayama-shi, Okayama (JP)

(72) Inventors: Tadashi Kasamoto, Kurashiki (JP); Masaya Ocho, Okayama (JP); Ayaka Yoshimura, Okayama (JP); Takashi Hirayama, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 14/893,982

(22) PCT Filed: Mar. 3, 2015

(86) PCT No.: PCT/JP2015/056192
§ 371 (c)(1),
(2) Date: Nov. 25, 2015

(87) PCT Pub. No.: WO2015/133465
PCT Pub. Date: Sep. 11, 2015

(65) Prior Publication Data
US 2016/0133366 A1 May 12, 2016

(30) Foreign Application Priority Data

Mar. 3, 2014 (JP) .................................. 2014-040672
Aug. 25, 2014 (JP) .................................. 2014-170126

(51) Int. Cl.
| | | |
|---|---|---|
| H01F 1/10 | (2006.01) | |
| H01F 1/117 | (2006.01) | |
| H01F 7/02 | (2006.01) | |
| C08J 3/24 | (2006.01) | |
| C08J 5/12 | (2006.01) | |

(52) U.S. Cl.
CPC . H01F 1/10 (2013.01); C08J 3/24 (2013.01); C08J 5/124 (2013.01); H01F 1/117 (2013.01); H01F 7/0215 (2013.01); C08J 2309/02 (2013.01); C08J 2361/06 (2013.01); C08J 2409/02 (2013.01); C08J 2461/06 (2013.01)

(58) Field of Classification Search
CPC .......... H01F 1/117; H01F 7/0215; H01F 1/10; C08J 3/24; C08J 5/124; C08J 2361/06; C08J 2409/02; C08J 2461/06; C08J 2309/02
See application file for complete search history.

(56) References Cited

U.S. PATENT DOCUMENTS

| | | | |
|---|---|---|---|
| 2002/0183427 A1 | 12/2002 | Yamaguchi | |
| 2006/0169943 A1 | 8/2006 | Yamaguchi | |
| 2007/0152657 A1* | 7/2007 | Yabe ..................... | F16C 19/186 324/174 |
| 2009/0110587 A1* | 4/2009 | Aramaki ............... | B22F 1/0055 419/10 |
| 2013/0093121 A1* | 4/2013 | Honkura ................. | H01F 1/083 264/429 |
| 2016/0268026 A1* | 9/2016 | Matsutomi ............... | H01F 1/36 |

FOREIGN PATENT DOCUMENTS

| | | |
|---|---|---|
| JP | 4-078107 A | 3/1992 |
| JP | 8-078228 A | 3/1996 |
| JP | 2000-150226 A | 5/2000 |
| JP | 2001-164124 A | 6/2001 |
| JP | 2001-200117 A | 7/2001 |
| JP | 2002-050532 A | 2/2002 |
| JP | 2005-012162 A | 1/2005 |
| JP | 2005-089533 A | 4/2005 |
| JP | 2005-336272 A | 12/2005 |
| JP | 2006-214775 A | 8/2006 |
| JP | 2007-010344 A | 1/2007 |
| JP | 2015-076515 A | 4/2015 |
| WO | WO 01/41162 A1 | 6/2001 |
| WO | WO 2015/012329 A1 | 1/2015 |

OTHER PUBLICATIONS

International Search Report (PCT/ISA/210) mailed on May 26, 2015, by the Japanese Patent Office as the International Searching Authority for International Application No. PCT/JP2015/056192.
Written Opinion (PCT/ISA/237) mailed on May 26, 2015, by the Japanese Patent Office as the International Searching Authority for International Application No. PCT/JP2015/056192.

* cited by examiner

*Primary Examiner* — Bernard Rojas
(74) *Attorney, Agent, or Firm* — Buchanan, Ingersoll & Rooney PC

(57) ABSTRACT

There is provided a magnetic rubber composition comprising a rubber (A), a thermosetting resin (B) and a magnetic powder (C), wherein a mass ratio (A/B) of the rubber (A) to the thermosetting resin (B) is 0.2 to 5, and a mass ratio [C/(A+B)] of the magnetic powder (C) to the total mass of the rubber (A) and the thermosetting resin (B) is 0.5 to 20. It gives a magnetic rubber molded article excellent in flexibility and abrasion resistance, and a magnetic encoder produced therewith.

22 Claims, No Drawings

MAGNETIC RUBBER COMPOSITION, MAGNETIC RUBBER MOLDED ARTICLE OBTAINED BY CROSSLINKING THE SAME, AND MAGNETIC ENCODER

TECHNICAL FIELD

The present invention relates to a magnetic rubber composition containing a rubber, a thermosetting resin and a magnetic powder, as well as a magnetic rubber molded article made by crosslinking thereof. The invention also relates to a magnetic encoder produced by using the magnetic rubber molded article.

BACKGROUND ART

Magnetic rubber molded articles made by crosslinking a magnetic rubber composition containing a rubber and a magnetic powder have been used for various applications. One suitable application of a magnetic rubber molded article is a magnetic encoder, which is produced by magnetizing the magnetic rubber molded article. Here, a suitable rubber is an oil resistant rubber such as a nitrile rubber and an acrylic rubber. As a magnetic powder, a ferrite magnetic powder, a rare-earth magnetic powder and so on are properly used, depending on required performance. A magnetic encoder produced using such a magnetic rubber molded article is extensible even when it contains a large amount of a magnetic powder, and have been, therefore, widely used in applications in which flexibility is required. However, a magnetic encoder using such a magnetic rubber molded article is sometimes insufficiently friction-resistant and has been thus used for limited applications.

Patent Reference No. 1 has described a magnetic encoder made by forming an annular product from a magnetic material containing a magnetic powder and a binder, which is then circumferentially multipole-magnetized, wherein the binder is a thermosetting resin and the binder accounts for 10 to 70% by volume of the magnetic material. The reference has described that the magnetic encoder has a large magnetic flux density, is resistant to breakage and detachment from a mounting plate of a magnet unit, exhibits high productivity, is highly reliable and is inexpensive. This magnetic encoder is, however, substantially inextensible and could not been, therefore, used for applications requiring flexibility.

Patent Reference No. 2 has described a bond magnet in which a rare-earth magnetic powder is dispersed in a rubber binder, wherein the rare-earth magnetic powder is coated by an antirust agent and an epoxy resin. For producing the bond magnet, a rare-earth magnetic powder is pre-coated by a film made of an antirust agent and an epoxy resin, and then mixed with a rubber binder and a curing agent. A bond magnet described in an example therein contains a 0.12-fold by weight of an epoxy resin based on a rubber binder. Furthermore, there is described that in the bond magnet, oxidation of a rare-earth magnetic powder can be inhibited. This magnetic encoder is, however, insufficiently abrasion-resistant.

PRIOR ART REFERENCES

Patent References

Patent Reference No. 1: JP 2007-10344A
Patent Reference No. 2: JP 1992-78107A

SUMMARY OF THE INVENTION

Problem to be Solved by the Invention

To solve the above problems, an objective of the present invention is to provide a magnetic rubber molded article exhibiting excellent flexibility and abrasion resistance; a magnetic encoder produced therewith, as well as production processes therefor. Another objective of the present invention is to provide a magnetic rubber composition used for production thereof.

Means for Solving Problem

The above problems can be solved by providing a magnetic rubber composition comprising a rubber (A), a thermosetting resin (B) and a magnetic powder (C), wherein a mass ratio (A/B) of the rubber (A) to the thermosetting resin (B) is 0.2 to 5, and a mass ratio [C/(A+B)] of the magnetic powder (C) to the total mass of the rubber (A) and the thermosetting resin (B) is 0.5 to 20.

The rubber (A) is preferably at least one selected from a nitrile rubber and an acrylic rubber. More preferably, the rubber (A) is at least one selected from the group consisting of a non-hydrogenated nitrile rubber (NBR); a hydrogenated nitrile rubber (HNBR); an acrylic rubber (ACM) produced by copolymerizing two or more acrylic acid esters selected from methyl acrylate, ethyl acrylate, butyl acrylate and methoxyethyl acrylate with a crosslinkable monomer; and an acrylic rubber (AEM) produced by copolymerizing methyl acrylate and ethylene with a crosslinkable monomer. Also preferably, the rubber (A) has a carboxyl group or a carboxylic acid anhydride group.

The thermosetting resin (B) is preferably at least one selected from a phenolic resin, an epoxy resin and a urethane resin, more preferably a phenolic resin. A suitable embodiment of the thermosetting resin (B) is a phenolic resin having an aliphatic group having 12 or more carbon atoms. Another suitable embodiment of the thermosetting resin (B) is at least one selected from the group consisting of an alkylphenol-modified phenolic resin, a polyvinyl-butyral-modified phenolic resin and a rubber-modified phenolic resin, and a particularly suitable embodiment is a cashew-modified phenolic resin. Also preferably, the thermosetting resin (B) contains a curing agent consisting of a polyamine.

Also preferably, the magnetic powder (C) is at least one selected from a ferrite magnetic powder and a rare-earth magnetic powder.

Furthermore, the composition preferably contains a graphite (D), wherein a mass ratio [D/(A+B)] of the graphite (D) to the total mass of the rubber (A) and the thermosetting resin (B) is 0.02 to 0.5. Also preferably, the composition contains a carbon black (E), wherein a mass ratio [E/(A+B)] of the carbon black (E) to the total mass of the rubber (A) and the thermosetting resin (B) is 0.02 to 0.5. Also preferably, the composition contains a coupling agent (F), wherein a mass ratio [F/(A+B)] of the coupling agent (F) to the total mass of the rubber (A) and the thermosetting resin (B) is 0.0002 to 0.02.

A suitable embodiment of the present invention is a magnetic rubber molded article produced by crosslinking the magnetic rubber composition. A suitable embodiment of the present invention is a magnetic encoder having a magnet produced by magnetizing the magnetic rubber molded article. A suitable embodiment is a magnetic encoder, having a supporting member mountable on a rotating body and an annular magnetic rubber molded article mounted on the supporting member, wherein the magnetic rubber molded article is circumferentially alternately magnetized to N pole and S pole. A more suitable embodiment is a magnetic encoder, wherein the magnetic rubber molded article is bonded to the supporting member via a thermosetting adhesive. A suitable application of a magnetic encoder of the present invention is a magnetic encoder for a sensor rotor in an antilock braking system for a vehicle.

The above problems can be also solved by providing a process for producing the magnetic rubber molded article, comprising molding and crosslinking the magnetic rubber composition.

The above problems can be also solved by providing a process for producing the magnetic encoder, comprising compression molding or injection molding and crosslinking the magnetic rubber composition to form a magnetic rubber molded article, and applying a magnetic field to the molded article to magnetize the article. It is herein suitable to apply a magnetic field to the molded article during compression molding or injection molding. It is also suitable that after molding and crosslinking the magnetic rubber composition, the thermosetting adhesive is cured to fix the magnetic rubber molded article on the supporting member via the thermosetting adhesive. It is also suitable that while the magnetic rubber composition is molded and crosslinked, the thermosetting adhesive is cured to fix the magnetic rubber molded article on the supporting member via the thermosetting adhesive.

Effects of the Invention

A magnetic rubber molded article made by crosslinking a magnetic rubber composition of the present invention is excellent in flexibility and abrasion resistance. The magnetic rubber molded article is suitable for a magnetic encoder.

MODES FOR CARRYING OUT THE INVENTION

A magnetic rubber composition of the present invention contains a rubber (A), a thermosetting resin (B) and a magnetic powder (C). Involvement of the rubber (A) and the thermosetting resin (B) in predetermined rates allows for providing a magnetic rubber molded article excellent in flexibility and abrasion resistance.

There are no particular restrictions to the type of a rubber (A). Among others, at least one selected from a nitrile rubber and an acrylic rubber is preferable in the light of oil resistance and heat resistance. Different types of rubbers (A) can be used together.

A nitrile rubber used in the present invention can be, but not limited to, a copolymer of acrylonitrile and 1,3-butadiene. The remaining double bond in 1,3-butadiene after polymerization is hydrogenated as appropriate. A non-hydrogenated nitrile rubber (NBR) and a hydrogenated nitrile rubber (HNBR) can be properly used, depending on an intended application. A content of acrylonitrile units in a nitrile rubber is preferably 15 to 50% by mass. 1,3-butadiene units including hydrogenated units account for the whole or substantial part of the rest. In the light of providing a magnetic rubber molded article with large extension after heat aging, a hydrogenated nitrile rubber (HNBR) is suitably used. An iodine number of a hydrogenated nitrile rubber is preferably 50 g/100 g or less, more preferably 20 g/100 g or less. Without limiting the spirit of the invention, the rubber can contain constitutional units derived from other copolymerizable monomers. For example, the rubber can contain a functional group such as a carboxyl group and a carboxylic acid anhydride group.

Using a nitrile rubber having a carboxyl or carboxylic acid anhydride group in the present invention, a magnetic rubber molded article produced therefrom has improved abrasion resistance. Although the reason for improvement in abrasion resistance by the presence of such functional groups is not clearly understood, reaction of these functional groups with the curing agent contained in the thermosetting resin (B) would be responsible for such improvement. There are no particular restrictions to a way of introducing a carboxyl or carboxylic acid anhydride group, and preferably a monomer containing a functional group or its precursor is copolymerized with acrylonitrile and 1,3-butadiene. Such a monomer is suitably α,β-ethylenic unsaturated dicarboxylic acid monoester monomers. Here, a nitrile rubber is a nitrile rubber containing α,β-ethylenic unsaturated dicarboxylic acid monoester monomer units. A content of the α,β-ethylenic unsaturated dicarboxylic acid monoester monomer units is suitably 1 to 10% by mass.

Examples of an α,β-ethylenic unsaturated dicarboxylic acid monoester monomer include maleic acid monoalkyl esters such as monomethyl maleate, monoethyl maleate, monopropyl maleate and mono-n-butyl maleate; maleic acid monocycloalkyl esters such as monocyclopentyl maleate, monocyclohexyl maleate and monocycloheptyl maleate; maleic acid monoalkylcycloalkyl esters such as monomethylcyclopentyl maleate and monoethylcyclohexyl maleate; fumaric acid monoalkyl esters such as monomethyl fumarate, monoethyl fumarate, monopropyl fumarate and mono-n-butyl fumarate; fumaric acid monocycloalkyl esters such as monocyclopentyl fumarate, monocyclohexyl fumarate and monocycloheptyl fumarate; fumaric acid monoalkylcycloalkyl esters such as monomethylcyclopentyl fumarate and monoethylcyclohexyl fumarate; citraconic acid monoalkyl esters such as monomethyl citraconate, monoethyl citraconate, monopropyl citraconate and mono-n-butyl citraconate; citraconic acid monocycloalkyl esters such as monocyclopentyl citraconate, monocyclohexyl citraconate and monocycloheptyl citraconate; citraconic acid monoalkylcycloalkyl esters such as monomethylcyclopentyl citraconate and monoethylcyclohexyl citraconate; itaconic acid monoalkyl esters such as monomethyl itaconate, monoethyl itaconate, monopropyl itaconate and mono-n-butyl itaconate; itaconic acid monocycloalkyl esters such as monocyclopentyl itaconate, monocyclohexyl itaconate and monocycloheptyl itaconate; and itaconic acid monoalkylcycloalkyl esters such as monomethylcyclopentyl itaconate and monoethylcyclohexyl itaconate.

A nitrile rubber used in the present invention is preferably a hydrogenated nitrile rubber containing a carboxyl or carboxylic acid anhydride group because it can provide a molded article with large extension after heat aging which is highly resistant to abrasion. A suitable example is a hydrogenated nitrile rubber containing α,β-ethylenic unsaturated dicarboxylic acid monoester monomer units.

There are no particular restrictions to an acrylic rubber used in the present invention as long as it is a rubber an acrylic acid ester as a main component. Suitable examples of an acrylic acid ester include methyl acrylate, ethyl acrylate, butyl acrylate and methoxyethyl acrylate. Examples of a monomer to be copolymerized with an acrylic acid ester include acrylonitrile, ethylene and 2-chloroethyl vinyl ether. Specifically, an acrylic rubber (ACM) made by copolymerizing two or more acrylic acid esters selected from methyl acrylate, ethyl acrylate, butyl acrylate and methoxyethyl acrylate with a crosslinkable monomer, an acrylic rubber (AEM) made by copolymerizing methyl acrylate and ethylene with a crosslinkable monomer and so on are properly used, depending on their intended application. As an AEM, for example, "VAMAC"® from DuPont is available. Without limiting the spirit of the present invention, the rubber can contain constitutional units derived from other copolymerizable monomers. Using an acrylic rubber having a carboxyl or carboxylic acid anhydride group in the present invention, a magnetic rubber molded article produced therefrom can have improved abrasion resistance. Here, the crosslinkable monomer used has a carboxyl or carboxylic acid anhydride group. Although the reason for improvement in abrasion resistance by the presence of such functional groups is not clearly understood, reaction of these functional groups with the curing agent contained in the thermosetting resin (B) would be responsible for such improvement.

There are no particular restrictions to the thermosetting resin (B) used in the present invention as long as it cures by initiation of a crosslinking reaction under heating. Among others, it is preferably at least one selected from a phenolic resin, an epoxy resin and a urethane resin in the light of abrasion resistance and reactivity. As used herein, a thermosetting resin (B) refers to not a resin after curing but a resin before curing, and it can be combined with a rubber (A) and a magnetic powder (C) to provide a magnetic rubber composition of the present invention. Therefore, herein, any phenolic, epoxy or urethane resin can be used as long as when it is cured alone, a phenolic, epoxy or urethane resin is formed, respectively. Different types of thermosetting resins (B) can be used together.

The thermosetting resin (B) can be that curing by initiation of a crosslinking reaction by heating a base polymer itself or that curing by initiation of a crosslinking reaction by heating a mixture of a base polymer and a curing agent. Depending on the type of a thermosetting resin, a curing agent used herein is suitably a polyamine. For example, for a phenolic resin, a polyamine such as hexamethyltetramine is suitably used. When a polyamine is used as a curing agent, it reacts with a rubber (A) which has carboxyl group or carboxylic acid anhydride group, to improve abrasion resistance of a molded article produced.

A suitable phenolic resin is a thermosetting resin (B). Any of novolak-type phenolic resins and resol-type phenolic resins can be used as a phenolic resin. For a novolak-type phenolic resin, a novolak as a thermoplastic resin premixed with a curing agent such as hexamethyltetramine is commercially available and can be blended. When a magnetic rubber composition of the present invention is prepared, a novolak and a curing agent can be separately added and kneaded before molding. Meanwhile, a resol resin can be thermally cured without a curing agent, allowing it to be a sole additive. The use of a phenolic resin can improve abrasion resistance of a magnetic rubber molded article of the present invention and improvement in hardness and heat resistance.

A phenolic resin used in the present invention is preferably a phenolic resin having an aliphatic group having 12 or more carbon atoms. The use of such a phenolic resin allows for a magnetic rubber molded article with a larger extension after heat aging than an unmodified phenolic resin. Such a magnetic rubber molded article is useful for an application under high temperature for a long period. In particular, a magnetic rubber molded article bonded to a metal with a large coefficient of thermal expansion must tolerate thermal expansion and shrinkage of the metal for a long period, and essentially its extension after heat aging must be large. As used herein, an aliphatic group having 12 or more carbon atoms refers to a group attaching to a phenolic resin skeleton, which has 12 or more continuous non-aromatic carbon atoms. A bond between carbon atoms can be a single or double bond. Substituents other than a hydrocarbon can be contained.

Suitable examples of a phenolic resin having an aliphatic group having 12 or more carbon atoms include an alkylphenol-modified phenolic resin, a polyvinyl-butyral-modified phenolic resin and a rubber-modified phenolic resin.

A magnetic rubber molded article produced from an alkylphenol-modified phenolic resin exhibits further improved abrasion resistance than a magnetic rubber molded article produced from an unmodified phenolic resin. An alkylphenol used for the modification is a phenol in which an alkyl group having 12 or more carbon atoms is attached to the benzene ring and which can have other substituents. A particularly suitable alkylphenol-modified phenolic resin is a cashew-modified phenolic resin. A cashew-modified phenolic resin is a phenolic resin modified by cashew oil (an oil contained in a cashew nut shell). A main component of cashew oil is cardanol (3-heptadecylphenol), in which a linear hydrocarbon group having 15 carbon atoms is attached to a phenolic resin skeleton.

A polyvinyl-butyral-modified phenolic resin is preferable in the light of providing a magnetic rubber molded article with large extension after heat aging. Here, a polyvinyl butyral is produced by saponifying a polyvinyl acetate obtained by polymerization of vinyl acetate to give a polyvinyl alcohol and acetalizing the polyvinyl alcohol by butylaldehyde. Generally, 10 or more vinyl acetate molecules are polymerized, so that a hydrocarbon group having 20 or more carbon atoms is attached to a phenolic resin skeleton.

As used herein, a rubber-modified phenolic resin refers to a phenolic resin modified by a rubber component such as a diene rubber, an olefin rubber and a styrene rubber. In the light of affinity for the rubber (A), the rubber component is preferably NBR or HNBR. The rubber component is generally a polymerization product of 10 or more monomer molecules, and therefore, a linear hydrocarbon group having 20 or more carbon atoms is attached to a phenolic resin skeleton.

An epoxy resin is a resin curable by a crosslinking reaction via epoxy groups present in a prepolymer. The most representative example of the prepolymer is, but not limited to, a copolymer of bisphenol A and epichlorohydrin. A curing agent can be a polyamine or acid anhydride. In the present invention, a premix of an epoxy-containing prepolymer and a curing agent can be used, or these can be separately added and the mixture is kneaded before molding. By using an epoxy resin, abrasion resistance of a magnetic rubber molded article of the present invention can be improved and hardness and heat resistance can be also improved.

A urethane resin is a urethane-containing polymer, which is generally formed by condensation reaction of an isocyanate-containing compound with a hydroxy-containing compound. When a polymer formed is not thermoplastic, it can be used as a thermosetting resin (B) of the present invention. A urethane resin is generally produced by reacting a polyol with a polyisocyanate. In the present invention, a premix of a polyol and a polyisocyanate can be used, or these can be separately added and the mixture is kneaded before molding. By using a urethane resin, abrasion resistance of a magnetic rubber molded article of the present invention can be improved while increase in hardness is inhibited, resulting in excellent flexibility.

A magnetic powder (C) used in the present invention can be, but not limited to, those used for a common magnetic rubber molded article. In many cases, at least one selected from a ferrite magnetic powder and a rare-earth magnetic powder is used. These can be mixed before use. A ferrite magnetic powder is resistant to oxidation and therefore, is suitable for the use under various circumstances. Examples of a ferrite magnetic powder include a strontium ferrite magnetic powder and a barium ferrite magnetic powder. Furthermore, a rare-earth magnetic powder has a large magnetic force per a unit volume, so that it can provide a strong magnet. Suitable examples of a rare-earth magnetic powder include a neodymium-iron magnetic powder represented by an Nd—Fe—B alloy, a samarium-iron magnetic powder represented by an Sm—Fe—N alloy and a samarium-cobalt magnetic powder represented by an Sm—Co alloy. In these alloys, other elements can be, in addition to the above elements, added as long as performance as a magnet powder is not inhibited. Two or more of such rare-earth magnetic powders can be used together.

In a magnetic rubber composition of the present invention, a mass ratio (A/B) of a rubber (A) to a thermosetting resin (B) is 0.2 to 5. If a mass ratio (A/B) is less than 0.2, extension is insufficient, so that an article cannot be tolerant to deformation, leading to breakage or detachment in the case of adhesion to a member having a large linear expansion coefficient such as a metal. In particular, when it is used for an underbody of a vehicle, the article comes into contact with the ambient air. Thus, since it must be tolerant to a very large temperature difference between day and night, seasons and regions while being required to be highly reliable, adhesiveness to a metal is particularly essential. A mass ratio (A/B) is suitably 0.3 or more, more suitably 0.4 or more, further suitably 0.5 or more, particularly suitably 0.6 or more. If the mass ratio (A/B) is more than 5, abrasion resistance is insufficient, so that it cannot be used under frictional conditions. The mass ratio (A/B) is suitably 3 or less, more suitably 2 or less, further suitably 1.5 or less, particularly suitably 1.2 or less. Herein, a mass of the thermosetting resin (B) is the total mass of a base polymer such as a phenolic resin and a curing agent such as a polyamine.

In a magnetic rubber composition of the present invention, a mass ratio [C/(A+B)] of the magnetic powder (C) to the total mass of the rubber (A) and the thermosetting resin (B) is 0.5 to 20. If the mass ratio [C/(A+B)] is less than 0.5, a magnetic force is insufficient, so that an article cannot be used for an application requiring a high magnetic force. The mass ratio [C/(A+B)] is suitably 1 or more, more suitably 1.5 or more, further suitably 2 or more. On the other hand, when the mass ratio [C/(A+B)] is more than 20, a tensile strength is reduced. The mass ratio [C/(A+B)] is suitably 10 or less, more suitably 8 or less, further suitably 6 or less.

A magnetic rubber composition of the present invention preferably further contains a graphite (D). Involvement of the graphite (D) can improve abrasion resistance of a molded article obtained. The graphite (D) can be a scale-like graphite powder. Here, a mass ratio [D/(A+B)] of the graphite (D) to the total mass of the rubber (A) and the thermosetting resin (B) is preferably 0.02 to 0.5.

It is also preferable that a magnetic rubber composition of the present invention contains a carbon black (E). Involvement of the carbon black (E) can improve abrasion resistance while maintaining extension of a molded article obtained. Here, a mass ratio [E/(A+B)] of the carbon black (E) to the total mass of the rubber (A) and the thermosetting resin (B) is preferably 0.02 to 0.5.

It is also preferable that a magnetic rubber composition of the present invention further contains a coupling agent (F). Involvement of the coupling agent (F) can improve productivity because a time for a crosslinking reaction is reduced. Here, a mass ratio [F/(A+B)] of the coupling agent (F) to the total mass of the rubber (A) and the thermosetting resin (B) is preferably 0.0002 to 0.02. The coupling agent (F) used in the present invention can be a silane coupling agent, a titanate coupling agent, an aluminate coupling agent or the like, preferably a silane coupling agent. A silane coupling agent is an alkoxysilane having an organic group having a reactive functional group. Examples of the reactive functional group include an amino group, an epoxy group, a methacryl group, a vinyl group and a mercapto group, suitably an amino group.

As long as effects of the present invention are not inhibited, a magnetic rubber composition of the present invention can contain components other than the rubber (A), the thermosetting resin (B), the magnetic powder (C), the graphite (D), the carbon black (E) and the coupling agent (F). It can contain various additives commonly used in a magnetic rubber composition such as a vulcanizing agent, a vulcanization accelerator, a vulcanization aid, an acid acceptor, a colorant, a filler other than graphite (D) or carbon black (E), and a plasticizer. However, in a magnetic rubber composition of the present invention, a crosslinking agent such as sulfur, a peroxide and a polyamine compound is not essential and it is often preferable that the composition does not contain a crosslinking agent.

A magnetic rubber composition of the present invention is prepared by blending the above components. There are no particular restrictions to a blending method and the composition can be kneaded using an open roll, a kneader, a Banbury mixer, an intermixer, an extruder or the like. Kneading using an open roll or a kneader is particularly preferable. A temperature of a magnetic rubber composition during kneading is preferably 20 to 120° C.

The magnetic rubber composition thus obtained is molded and crosslinked to give a magnetic rubber molded article of the present invention. Generally, the magnetic rubber composition is molded to a desired shape and then crosslinked by heating. A magnetic rubber composition can be molded by injection molding, extrusion molding, compression molding, roll molding or the like. Among these injection molding and compression molding are suitable. Here, the composition can be molded before crosslinking or molded while being crosslinked. Alternatively, the composition can be crosslinked while being molded, and then subjected to secondary crosslinking. A molding temperature is generally 10 to 200° C., preferably 25 to 120° C. A crosslinking temperature is generally 100 to 250° C., preferably 110 to 220° C., more preferably 120 to 200° C. A crosslinking time is generally 30 sec to 24 hours, suitably 1 min to 24 hours. The lower limit of the crosslinking time is more preferably 1.5 min or more. The upper limit of the crosslinking time is preferably 12 hours or less, more preferably 6 hours or less. Depending on the shape and the dimension of a magnetic rubber molded article, it is possible that the surface is crosslinked while the inside is not sufficiently crosslinked. Therefore, secondary crosslinking can be conducted by further heating. The crosslinking can be conducted by a heating method commonly used for rubber crosslinking such as compression heating, steam heating, oven heating and hot-air heating. A remaining magnetic flux density can be increased by crosslinking/molding in a magnetic field.

During such crosslinking, a crosslinking reaction of the thermosetting resin proceeds to curing, so that a rubber component would be fixed. Here, the rubber component and the thermosetting resin can mutually react or not. In any case, it has been found that a rubber (A) and a thermosetting resin (B) can be combined and crosslinked to provide a magnetic rubber molded article excellent in abrasion resistance while the composition keeps flexibility as a whole.

A magnetic rubber molded article of the present invention thus produced is excellent not only in extension and abrasion resistance but also magnetic properties. It can be, therefore, suitably used for various applications requiring magnetic properties, flexibility and abrasion resistance. For example, it can be formed into a shape such as a rubber magnet sheet, which can be used for various applications.

Among others, a particularly suitable application is a magnetic encoder equipped with a magnet produced by magnetizing the magnetic rubber molded article. The magnet can have only one pair of S and N poles, but in many cases, it is a multipolar magnet in which magnetic poles are alternately arranged although magnetization style is not limited to these. There are no particular restrictions to the shape of the magnet, but it is preferably annular such as discoidal and cylindrical in the case of detecting rotary movement. This is practically the most important aspect where circumferentially alternately arranged magnetic poles can detect an angle. On the other hand, it can be a flat strap-shaped magnet in an application of detecting linear movement.

A suitable process for producing a magnetic encoder of the present invention has, in addition to the step of forming a magnetic rubber molded article by crosslinking as described above, the step of applying a magnetic field to the molded article to magnetize the article. Here, it is suitable to apply a magnetic field to the molded article during compression molding or injection molding. More suitably, a magnetic field is applied in a direction perpendicular to the surface of the molded article.

The magnetic encoder has, as necessary, a supporting member which supports the magnet. The supporting member is preferably a metal member, particularly preferably a metal plate. There are no particular restrictions to a method for bonding a magnetic rubber molded article to a supporting member, and during crosslinking the magnetic rubber molded article, these can be directly bonded. However, for more firmly bonding a magnetic rubber composition of the present invention to a supporting member, the magnetic rubber molded article is preferably bonded to the supporting member via a thermosetting adhesive. Here, after molding and crosslinking the magnetic rubber composition, the thermosetting adhesive can be cured to fix the magnetic rubber molded article on the supporting member via the thermosetting adhesive. Alternatively while the magnetic rubber composition is molded and crosslinked, the thermosetting adhesive can be cured to fix the magnetic rubber molded article on the supporting member via the thermosetting adhesive.

There are no particular restrictions to the thermosetting adhesive used herein as long as it is a type which cures by a crosslinking reaction initiated by heating. A phenolic resin, an epoxy resin, a urethane resin, a rubber glue prepared by dissolving an unvulcanized rubber in solvent, a silane coupling agent and so on can be used. Adhesiveness is often improved by using a thermosetting adhesive which is the same type as the thermosetting resin (B) contained in the magnetic rubber composition. Different types of thermosetting adhesives can be used together.

A suitable aspect of the present invention is a magnetic encoder having a supporting member mountable on a rotating body and an annular magnetic rubber molded article mounted on the supporting member, wherein the magnetic rubber molded article is circumferentially alternately magnetized to N pole and S pole. This is useful as an encoder for detecting rotary movement. Here, the magnetic rubber molded article can be mounted on a plane perpendicular to the rotation axis such as the surface of a disk, or can be mounted on a plane parallel to the rotation axis such as the surface of a cylinder.

There are no particular restrictions to an application of a magnetic encoder. Magnetic encoders having an annular or discoidal multipolar magnet where magnetic poles are circumferentially alternately arranged is used in a sensor for detecting rotary movement. They are, for example, used in a wheel-axis rotational rate detector, a crank-angle detector and a motor rotational angle detector. Those having a multipolar magnet in which magnetic poles are alternately arranged in a linear direction is used in a sensor for detecting linear movement. They are, for example, used in a linear guide device, a power window, a power sheet, a brake stepping-in amount detector and a business equipment. Among others, a magnetic encoder for a sensor rotor in an antilock braking system for a vehicle is the most useful application for a magnetic encoder of the present invention which is excellent not only in flexibility, abrasion resistance and magnetic properties but also in adhesiveness of a magnetic rubber molded article to a supporting member. Since an antilock braking system for a vehicle is subjected to a heat cycle of high and low temperatures in use, it is particularly important to prevent cracks due to reduced extension by heat aging.

EXAMPLES

Starting materials used in examples below are as follows.
Nitrile Rubber (NBR)
"N220SH" from JSR Corporation (acrylonitrile content: 41%, Mooney viscosity (ML$_{1+10}$, 100° C.): 80)
Carboxyl-Containing Hydrogenated Nitrile Rubber (Modified HNBR)
"Zetpol 2510" from ZEON Corporation: hydrogenated copolymer of acrylonitrile/1,3-butadiene/α,β-ethylenic unsaturated dicarboxylic acid monoester (acrylonitrile content: 36% by weight, Mooney viscosity (ML$_{1+10}$, 100° C.): 45, iodine number: 12 g/100 g or less)
Novolak-Type Phenolic Resin (Unmodified)
"P-5510" from DIC Corporation; containing a curing agent (hexamethylenetetramine)
Novolak-Type Phenolic Resin (Unmodified)
"PR-50731" from Sumitomo Bakelite Co., Ltd.; not containing a curing agent
Cashew-Modified Phenolic Resin
"PR-12686" from Sumitomo Bakelite Co., Ltd.; not containing a curing agent
Polyvinyl-Butyral (PVB) Modified Phenolic Resin
"TD-2126A" from DIC Corporation; containing a curing agent (hexamethylenetetramine)
Rubber-Modified Phenolic Resin
"TD-696A" from DIC Corporation; containing a curing agent (hexamethylenetetramine), nitrile-rubber (NBR) modified
Curing Agent (Hexamethylenetetramine)
"Hexamine" from Mitsubishi Gas Chemical Co., Inc.
Magnetic Powder
Strontium ferrite "FH-801" from Toda Kogyo Corporation 4,4'-Bis(α,α-dimethylbenzyl)diphenylamine (Anti-Aging Agent)
"Nocrac CD" from Ouchi Shinko Chemical Industrial Co., Ltd.
n-Paraffin Wax
"PARAFFIN WAX-115" from Nippon Seiro Co., Ltd.
Graphite
"F#3" from Nippon Graphite Industries, Ltd.
Carbon Black
"Ketchen black EC600JD" from Lion Corporation
Sulfur
"Sulfax200S" from Tsurumi Chemical Industry Co., Ltd.
N-cyclohexyl-2-benzothiazolesulfenamide (Crosslinking Aid, CBS)
"Sanceler CM" from Sanshin Chemical Industry Co., Ltd.
Tetramethylthiuram Disulfide (Crosslinking Aid, TMTD)
"Sanceler TT" from Sanshin Chemical Industry Co., Ltd.
1,8-Diazabicyclo[5,4,0]undecene-7 (Crosslinking Aid, DBU)
"RHENOGLAN XLA-60" from Rhein Chemie
Stearic Acid (Lubricant)
"Stearic acid Sakura" from NOF Corporation
Zinc Oxide
"Zinc oxide grade 1" from Hakusuitech Co., Ltd.
Tris(2-ethylhexyl)trimellitate (Plasticizer, TOTM)
"TOTM" from Daihachi Chemical Industry Co., Ltd.
Silane Coupling Agent
N-2-(aminoethyl)-3-aminopropyltrimethoxysilane
"KBM603" from Shin-Etsu Chemical Co., Ltd.

Example 1

[Preparation of an Uncrosslinked Rubber Sheet]

Using an open roll with a diameter of 8 inch, a composition of 80 parts by mass of a nitrile rubber "N220SH", 860 parts by mass of strontium ferrite "FH-801", 1 part by mass of 4,4'-bis(α,α-dimethylbenzyl)diphenylamine, 1 part by mass of n-paraffin wax and 144 parts by mass of a novolak-type phenolic resin "P-5510" was heated to 60 to 80° C. and kneaded for 30 min, to prepare an uncrosslinked rubber sheet with a thickness of 1 to 2 mm, which was used in the tests below. Table 1 shows compounding ratios.

[Tensile Test]

A tensile test was performed in accordance with JIS K6251. The uncrosslinked rubber sheet obtained was crosslinked by pressing at 180° C. for 3 min to give a crosslinked rubber sheet with a thickness of 1 mm. The crosslinked rubber sheet obtained was punched to give a dumbbell No. 3 specimen, which was used for determining a tensile strength (MPa) and an elongation (%) at 23° C. and a relative humidity of 50% at a tension rate of 500 mm/min. As a result, a tensile strength was 26 MPa and an elongation was 5%. These results are shown in Table 1.

[Measurement of Hardness]

Hardness was determined in accordance with JIS K6253-3. Three crosslinked rubber sheets with a thickness of 1 mm prepared as described for the tensile test were piled and measured for hardness at 23° C. and a relative humidity of 50% using a type D durometer; specifically, a value 3 sec after measurement initiation was determined. As a result, a D hardness was 87. The results are shown in Table 1.

[Abrasion Resistance]

A test piece was taken from a crosslinked rubber sheet with a thickness of 1 mm prepared as described for the tensile test. While a grinding stone was pushed against the test piece, the test piece was rotated for grinding and abrasion of the test piece was visually observed. In accordance with the following criteria, abrasion resistance was rated at "B". The results are shown in Table 1.

A: Substantially no abrasion is observed
B: Abrasion is subtle
C: Abrasion is small
D: Abrasion is much

[Remaining Magnetic Flux Density]

Using an uncrosslinked rubber sheet prepared above, a disk test piece with a diameter of 18 mm and a thickness of 2 mm was obtained. While a magnetic field is applied in a thickness direction, the test piece was pressed at 180° C. for 3 min for initiating crosslinking to give a crosslinked rubber test piece. A remaining magnetic flux density of the molded article obtained was measured by a direct-current type magnetic measuring instrument "BH Curve Tracer" from Metron Inc. As a result, a remaining magnetic flux density was 210 mT. The results are shown in Table 1.

[Adhesiveness to a Supporting Member]

An annular SUS430 supporting member (slinger) was used, which has a thickness of 0.6 mm and an L-shaped cross-section. For the dimensions of the supporting member, an inner diameter of the inner cylinder was 55 mm, an outer diameter of the outer circular ring was 67 mm, and an axis-direction length of the inner cylinder was 4.0 mm. Separately, an uncrosslinked rubber sheet with a thickness of 1.5 mm obtained was punched into a doughnut shape with an inner diameter of 56 mm and an outer diameter of 67 mm, which was then placed on a supporting member precoated with an adhesive "LJ201" from Lord Far East Inc. (an adhesive made from a phenolic resin). Subsequently, it was pressed at 180° C. for 3 min for initiating crosslinking to form a magnet unit with an inner diameter of 56 mm, an outer diameter of 67 mm and a thickness of 1.0 mm. The magnet unit firmly adhered to the supporting member, that is, adhesiveness was satisfactory.

Examples 2 and 3

An uncrosslinked rubber sheet was prepared and evaluated as described in Example 1, except that a compounding ratio of the nitrile rubber and the novolak-type phenolic resin was changed to that described in Table 1. The results are shown in Table 1 together.

Comparative Example 1

An uncrosslinked rubber sheet was prepared and evaluated as described in Example 1, except that a novolak-type phenolic resin is replaced with 0.4 parts by mass of sulfur, 1.5 parts by mass of N-cyclohexyl-2-benzothiazolesulfenamide (CBS), 1 part by mass of tetramethylthiuram disulfide (TMTD), 3 parts by mass of stearic acid, 5 parts by mass of zinc oxide and 5 parts by mass of tris(2-ethylhexyl)trimellitate (TOTM), the amount of the nitrile rubber was 100 parts by mass, and the amount of strontium ferrite was 530 parts by mass. Furthermore, in hardness measurement, an A hardness was, in addition to a D hardness, measured. The results are shown in Table 1 together.

TABLE 1

|  | Example 1 | Example 2 | Example 3 | Comparative Example 1 |
|---|---|---|---|---|
| Constitution of rubber composition | | | | |
| NBR | 80 | 100 | 120 | 100 |
| Unmodified phenol resin *1) | 144 | 120 | 96 | |
| Strontium ferrite | 860 | 860 | 860 | 530 |
| Anti-aging agent, Nocrac CD | 1 | 1 | 1 | 1 |
| PARAFFIN WAX | 1 | 1 | 1 | 1 |
| Sulfur | | | | 0.4 |
| Crosslinking aid, CBS | | | | 1.5 |
| Crosslinking aid, TMTD | | | | 1 |
| Stearic acid | | | | 3 |
| Zinc oxide | | | | 5 |
| Plasticizer, TOTM | | | | 5 |
| Evaluation Results | | | | |
| Tensile strength (MPa) | 26 | 28 | 28 | 6 |
| Elongation (%) | 5 | 10 | 30 | 500 |
| A hardness | | | | 83 |
| D hardness | 87 | 82 | 80 | 30 |
| Abrasion resistance | B | B | C | D |
| Remaining magnetic flux density (mT) | 210 | 210 | 210 | 200 |
| Adhesiveness | good | good | good | good |

*1) containing curing agent (hexamethylenetetramine)

Examples 4 to 13

An uncrosslinked rubber sheet was prepared and evaluated as described in Example 1, except that a compounding ratio of the starting materials was changed as shown in Table 2. Furthermore, after the crosslinked rubber sheet was heated at 150° C. for 72 hours, it was subjected to a tensile test and hardness measurement as described in Example 1. These results are shown in Table 2 together.

Examples 14 and 15

An uncrosslinked rubber sheet was prepared as described in Example 5, except that a compounding ratio of the starting materials was changed as shown in Table 2. Subsequently, evaluation was conducted as described in Example 5, except that the press conditions in preparing a crosslinked rubber for evaluating various properties was 180° C. and 2 min. These results are shown in Table 2 together. Even when a crosslinking time was as short as 2 min, a high-performance crosslinked molded article was produced. Furthermore, Example 15 containing stearic acid exhibited improved mold releasability after crosslinking by pressing, in comparison with Example 14. When the uncrosslinked rubber sheet prepared in Example 5 was used and the press conditions in preparing a crosslinked rubber test piece was 180° C. and a shorter period, that is, 2 min, blisters were formed in the molded article.

TABLE 2

|  | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|
| Constitution of rubber composition | | | | | | | | | | | | |
| Modified HNBR | 90 | 108 | 108 | 108 | | 90 | 108 | | 108 | | 108 | 108 |
| NBR | | | | | 90 | | | 90 | | 90 | | |
| Cashew-modified phenol resin | 100 | 80 | | | 100 | | 80 | | 80 | | 80 | 80 |
| PVB-modified phenol resin *1) | | | 80 | | | | | | | | | |
| Rubber-modified phenol resin *1) | | | | 80 | | | | | | | | |
| Unmodified phenol resin | | | | | | 100 | | 100 | | 100 | | |
| Curing agent (hexamethylenetetramine) | 7 | 7 | | | 7 | 7 | 7 | 7 | 7 | 7 | 7 | 7 |
| Strontium ferrite | 860 | 860 | 860 | 860 | 860 | 860 | 860 | 860 | 860 | 860 | 860 | 860 |
| Graphite | 18 | 18 | 18 | 18 | 18 | 18 | | 18 | | | 18 | 18 |
| Carbon black | 18 | 18 | 18 | 18 | 18 | 18 | 18 | | | | 18 | 18 |
| Anti-aging agent, Nocrac CD | 2 | 2 | 2 | 2 | 2 | 2 | 2 | 2 | 2 | 2 | 2 | 2 |
| PARAFFIN WAX | 1 | 1 | 1 | 1 | 1 | 1 | 1 | 1 | 1 | 1 | 1 | 1 |
| Crosslinking aid, DBU | 2 | 2 | 2 | 2 | | 2 | 2 | | 2 | | 2 | 2 |
| Silane coupling agent | | | | | | | | | | | 0.5 | 0.5 |
| Stearic acid | | | | | | | | | | | | 1 |
| Evaluation results | | | | | | | | | | | | |
| Normal state D hardness | 84 | 81 | 81 | 76 | 84 | 86 | 78 | 83 | 77 | 82 | 80 | 80 |
| Normal state Tensile strength (MPa) | 38 | 28 | 21 | 22 | 36 | 33 | 22 | 35 | 23 | 33 | 24 | 28 |
| Normal state Elongation (%) | 5 | 8 | 10 | 10 | 7 | 5 | 8 | 5 | 7 | 9 | 10 | 8 |
| After heat test 150° C. 72 hrs D hardness | 87 | 84 | 83 | 82 | 87 | 87 | 85 | 87 | 82 | 87 | 83 | 83 |
| After heat test 150° C. 72 hrs Tensile strength (MPa) | 38 | 30 | 28 | 31 | 25 | 26 | 32 | 20 | 26 | 17 | 26 | 29 |
| After heat test 150° C. 72 hrs Elongation (%) | 4 | 5 | 8 | 4 | 4 | 1 | 4 | 2 | 4 | 2 | 5 | 3 |
| Abrasion resistance | A | A | C | C | B | A | A | A | C | B | A | A |
| Remaining magnetic flux density (mT) | 200 | 204 | 190 | 195 | 198 | 203 | 205 | 201 | 205 | 204 | 201 | 203 |
| Adhesiveness | good | good | good | good | good | good | good | good | good | good | good | good |

*1) containing curing agent (hexamethylenetetramine)

The invention claimed is:

1. A magnetic rubber composition comprising a rubber (A), a thermosetting resin (B) and a magnetic powder (C), wherein a mass ratio (A/B) of the rubber (A) to the thermosetting resin (B) is 0.2 to 5, and a mass ratio [C/(A+B)] of the magnetic powder (C) to the total mass of the rubber (A) and the thermosetting resin (B) is 0.5 to 20.

2. The magnetic rubber composition as claimed in claim 1, wherein the rubber (A) is at least one selected from a nitrile rubber and an acrylic rubber.

3. The magnetic rubber composition as claimed in claim 2, wherein the rubber (A) is at least one selected from the group consisting of a non-hydrogenated nitrile rubber (NBR); a hydrogenated nitrile rubber (HNBR); an acrylic rubber (ACM) produced by copolymerizing two or more acrylic acid esters selected from methyl acrylate, ethyl acrylate, butyl acrylate and methoxyethyl acrylate with a crosslinkable monomer; and an acrylic rubber (AEM) produced by copolymerizing methyl acrylate and ethylene with a crosslinkable monomer.

4. The magnetic rubber composition as claimed in claim 1, wherein the rubber (A) comprises a carboxyl group or a carboxylic acid anhydride group.

5. The magnetic rubber composition as claimed in claim 1, wherein the thermosetting resin (B) is at least one selected from a phenolic resin, an epoxy resin and a urethane resin.

6. The magnetic rubber composition as claimed in claim 5, wherein the thermosetting resin (B) is a phenolic resin.

7. The magnetic rubber composition as claimed in claim 6, wherein the thermosetting resin (B) is a phenolic resin having an aliphatic group having 12 or more carbon atoms.

8. The magnetic rubber composition as claimed in claim 6, wherein the thermosetting resin (B) is at least one selected from the group consisting of an alkylphenol-modified phenolic resin, a polyvinyl-butyral-modified phenolic resin and a rubber-modified phenolic resin.

9. The magnetic rubber composition as claimed in claim 6, wherein the thermosetting resin (B) is a cashew-modified phenolic resin.

10. The magnetic rubber composition as claimed in claim 1, wherein the thermosetting resin (B) comprises a curing agent consisting of a polyamine.

11. The magnetic rubber composition as claimed in claim 1, further comprising a graphite (D), wherein a mass ratio [D/(A+B)] of the graphite (D) to the total mass of the rubber (A) and the thermosetting resin (B) is 0.02 to 0.5.

12. The magnetic rubber composition as claimed in claim 1, further comprising a carbon black (E), wherein a mass ratio [E/(A+B)] of the carbon black (E) to the total mass of the rubber (A) and the thermosetting resin (B) is 0.02 to 0.5.

13. The magnetic rubber composition as claimed in claim 1, further comprising a coupling agent (F), wherein a mass ratio [F/(A+B)] of the coupling agent (F) to the total mass of the rubber (A) and the thermosetting resin (B) is 0.0002 to 0.02.

14. A magnetic rubber molded article produced by crosslinking magnetic rubber composition as claimed in claim 1.

15. A magnetic encoder comprising a magnet produced by magnetizing magnetic rubber molded article as claimed in claim 14.

16. The magnetic encoder as claimed in claim 15, comprising a supporting member mountable on a rotating body and an annular magnetic rubber molded article mounted on the supporting member, wherein the magnetic rubber molded article is circumferentially alternately magnetized to N pole and S pole.

17. The magnetic encoder as claimed in claim 16, wherein the magnetic rubber molded article is bonded to the supporting member via a thermosetting adhesive.

18. The magnetic encoder as claimed in claim 15, for a sensor rotor in an antilock braking system for a vehicle.

19. A process for producing the magnetic rubber molded article as claimed in claim 14, comprising molding and crosslinking the magnetic rubber composition.

20. A process for producing the magnetic encoder as claimed in claim 15, comprising compression molding or injection molding and crosslinking the magnetic rubber composition to form a magnetic rubber molded article, and applying a magnetic field to the molded article to magnetize the article.

21. The process for producing a magnetic encoder as claimed in claim 20, wherein during compression molding or injection molding, a magnetic field is applied to the molded article.

22. The process for producing a magnetic encoder as claimed in claim 20, wherein while the magnetic rubber composition is molded and crosslinked, the thermosetting adhesive is cured to fix the magnetic rubber molded article on the supporting member via the thermosetting adhesive.

* * * * *